(12) United States Patent
Castellani et al.

(10) Patent No.: US 10,759,226 B2
(45) Date of Patent: Sep. 1, 2020

(54) HIGH PERFORMANCE TYRE

(71) Applicant: PIRELLI TYRE S.P.A., Milan (IT)

(72) Inventors: Luca Castellani, Milan (IT); Thomas Hanel, Milan (IT); Davide Dall'abaco, Milan (IT); Enrico Albizzati, Milan (IT); Antonio Proto, Fisciano (IT); Carmine Capacchione, Fisciano (IT)

(73) Assignee: PIRELLI TYRE S.P.A., Milan (IT)

( * ) Notice: Subject to any disclaimer, the term of this patent is extended or adjusted under 35 U.S.C. 154(b) by 97 days.

(21) Appl. No.: 15/747,346

(22) PCT Filed: Jul. 28, 2016

(86) PCT No.: PCT/IB2016/054500
§ 371 (c)(1),
(2) Date: Jan. 24, 2018

(87) PCT Pub. No.: WO2017/021828
PCT Pub. Date: Feb. 9, 2017

(65) Prior Publication Data
US 2018/0215202 A1    Aug. 2, 2018

(30) Foreign Application Priority Data
Jul. 31, 2015  (IT) .................. 102015000040710

(51) Int. Cl.
| | | |
|---|---|---|
| *C08L 9/00* | (2006.01) | |
| *B60C 1/00* | (2006.01) | |
| *C08F 212/08* | (2006.01) | |
| *C08F 236/10* | (2006.01) | |
| *C08L 9/06* | (2006.01) | |
| *C08L 21/00* | (2006.01) | |
| *C08F 4/64* | (2006.01) | |

(52) U.S. Cl.
CPC .......... *B60C 1/0016* (2013.01); *C08F 212/08* (2013.01); *C08F 236/10* (2013.01); *C08L 9/06* (2013.01); *C08L 21/00* (2013.01); *C08F 4/64196* (2013.01)

(58) Field of Classification Search
CPC .. C08F 212/08; C08F 236/10; C08F 4/64196; C08L 9/06; C08L 21/00; B60C 1/0016
USPC ....................................................... 523/152
See application file for complete search history.

(56) References Cited

U.S. PATENT DOCUMENTS

| | | |
|---|---|---|
| 3,903,019 A | 9/1975 | Hargis et al. |
| 4,112,210 A | 9/1978 | deZarauz |
| 4,129,705 A | 12/1978 | DeZarauz |
| 4,669,518 A | 6/1987 | Hargis et al. |
| 4,933,401 A | 6/1990 | Hattori et al. |
| 5,100,965 A | 3/1992 | Hsu et al. |
| 5,317,062 A | 5/1994 | Rodgers et al. |
| 5,753,579 A | 5/1998 | Jalics et al. |
| 6,103,842 A | 8/2000 | Halasa et al. |
| 6,429,245 B1 | 8/2002 | Francik et al. |
| 6,581,659 B1 | 6/2003 | Zanzig et al. |
| 6,627,715 B2 | 9/2003 | Halasa et al. |
| 6,872,772 B2 | 3/2005 | Steiner et al. |
| 6,889,737 B2 | 5/2005 | Weydert et al. |
| 7,048,023 B2 | 5/2006 | Herberger, Sr. et al. |
| 8,937,130 B2 | 1/2015 | Sasajima et al. |
| 10,557,002 B2* | 2/2020 | Fujita ........................ C08J 5/04 |
| 10,682,885 B2* | 6/2020 | Castellani ................ C08L 7/00 |
| 2004/0039104 A1 | 2/2004 | Bates et al. |
| 2004/0177907 A1 | 9/2004 | Steiner et al. |
| 2013/0116376 A1 | 5/2013 | Custodero et al. |
| 2018/0044455 A1* | 2/2018 | Castellani ............. C08K 5/548 |
| 2018/0051118 A1* | 2/2018 | Castellani ............. B60C 1/0016 |
| 2018/0057668 A1* | 3/2018 | Castellani ............. B60C 1/0016 |
| 2018/0079257 A1* | 3/2018 | Castellani ............... C08K 3/36 |

FOREIGN PATENT DOCUMENTS

| | | |
|---|---|---|
| EP | 1231079 A1 | 8/2002 |
| EP | 1593528 A1 | 11/2005 |
| WO | 2010/006655 A1 | 1/2010 |
| WO | 2011/161222 A1 | 12/2011 |
| WO | 2012/069335 A1 | 5/2012 |

OTHER PUBLICATIONS

Capacchione, C. et al., "Living, Isoselective Polymerization of 4-Methyl-1,3-Pentadiene and Styrenic Monomers and Synthesis of Highly Stereoregular Block Copolymers via Sequential Monomer Addition.", Macromolecules, 44, pp. 7940-7947, (2011).

Longo, P. et al., "Chemoselectivity in 4-Methyl-1,3-Pentadiene Polymerization in the Presence of Homogenous Ti-Based Catalysts.", Macromol. Rapid Commun., 18, pp. 183-190, (1997).

Loria, M., et al., "Styrene-Isoprene and Styrene-1,3-Pentadiene Copolymerisation Catalyzed by Titanium [OSSO]-Type Catalysts.", RSC Advances, vol. 5, pp. 65998-66004, (2015).

Proto, A., et al., "Copolymerization of Ethylene with 4-Methyl-1,3-Pentadiene Promoted by Titanium Complexes Containing a Tetradentate [OSSO]-Type Bis(Phenolato) Ligand.", Macromolecules, vol. 42, No. 18, pp. 6981-6985, (2009).

Proto, A., et al., "Living, Isoselective Polymerization of Styrene and Formation of Stereoregular Block Copolymers via Sequential Monomer Addition.", Macromolecules, vol. 43, No. 14, pp. 5919-5921, (2010).

(Continued)

*Primary Examiner* — Hannah J Pak
(74) *Attorney, Agent, or Firm* — Steinfl + Bruno LLP

(57) ABSTRACT

A tyre for wheels of vehicles, in particular motor vehicles, is described. The tyre has a tread with at least one isostyrene/trans-butadiene elastomeric copolymer with a styrene content higher than 30% by weight with respect to the total weight of copolymer and a molecular weight higher than 500,000. The tread has improved dynamic-mechanical behaviour at high temperatures, with higher dynamic modulus and hysteresis values, and at the same time better properties at break, optimum elasticity at low temperature and higher abrasion resistance.

14 Claims, 1 Drawing Sheet

(56) References Cited

OTHER PUBLICATIONS

International Preliminary Report on Patentability for International Application No. PCT/IB2016/054500 filed Jul. 28, 2016 on behalf of Pirelli Tyre S.P.A, dated Sep. 2, 2016. 7 pages. (English Only).
International Search Report for International Application No. PCT/IB2016/054500 filed Jul. 28, 2016 on behalf of Pirelli Tyre S.P.A, dated Sep. 2, 2016. 4 pages. (English Only).
Written Opinion for International Application No. PCT/IB2016/054500 filed Jul. 28, 2016 on behalf of Pirelli Tyre S.P.A, dated Sep. 2, 2016. 6 pages. (English Only).

* cited by examiner

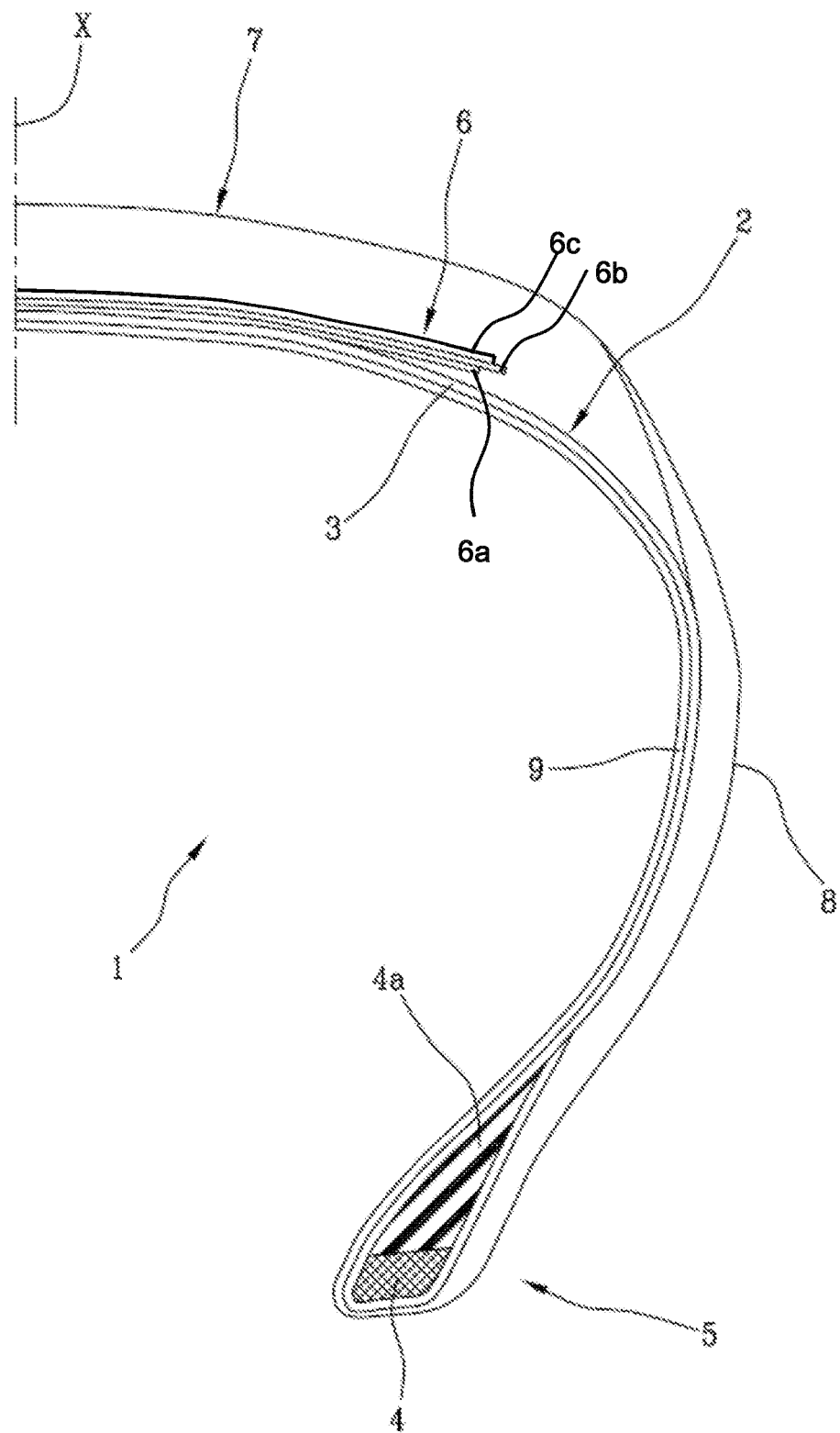

HIGH PERFORMANCE TYRE

CROSS REFERENCE TO RELATED APPLICATIONS

The present application is the U.S. national stage of International Patent Application PCT/IB2016/054500 filed internationally on Jul. 28, 2016, which, in turn, claims priority to Italian Patent Application No. 102015000040710 filed on Jul. 31, 2015.

FIELD OF THE INVENTION

The present invention relates to a high-performance tyre for the wheels of vehicles, in particular motor vehicles. In particular, the present invention relates to a high-performance tyre which comprises a tread including a crosslinked elastomeric material obtained by crosslinking a crosslinkable elastomeric composition.

PRIOR ART

A number of catalysts and processes for producing polymers and copolymers are described in documents U.S. Pat. Nos. 3,903,019, 4,112,210, 4,129,705, 4,933,401, 5,100,965, 5,753,579, 6,103,842 and 6,627,715.

The use of polymers and copolymers for producing at least one tyre component is described in documents U.S. Pat. Nos. 4,669,518, 5,317,062, 6,429,245, 6,581,659, 6,872,772, 6,889,737, 7,048,023, 8,937,130, US 2004/0039104, US 2004/0177907, EP 1 593 528, WO 2010/006655, WO 2011/161222 and WO 2012/069335.

SUMMARY OF THE INVENTION

One of the objectives of research in the field of tyres is that of increasing the driving safety together with increasing the overall performance qualities. High-performance tyres are designed to be used at high speeds and must therefore ensure high grip under all conditions, above all during changes in direction at high speeds and on slippery asphalt.

High-performance tyres, commonly known as "HP" and "UHP" ("High Performance" and "Ultra-High Performance") are, in particular, but not exclusively, those belonging to the classes "T", "U", "H", "V", "ZR", "W" and "Y" according to the E.T.R.T.O. classification, suitable for maximum speeds above 190 km/h and up to over 300 km/h, for which the working performance qualities at high temperatures are critical, and constitute one of the most important factors in their design and production.

Typically, the elastomeric compositions used for the production of high-performance tyre treads may include large amounts of styrene-butadiene copolymers (SBR).

High-performance tyres are subjected, during use, in particular during driving and manoeuvring at high speed, to an appreciable increase in temperature, which may bring about weakness in the tread and have a negative impact on the grip. Consequently, it is necessary to ensure consistency of the mechanical properties and the performance qualities also when the temperature of the tyre increases.

At the same time, high-performance tyres must ensure optimum performance qualities also under non-extreme driving conditions.

The rigidity and hysteresis of the elastomeric material introduced into the tyre tread have an influence on its behaviour.

High hysteresis accompanied by high values for the mechanical properties may give the tyre tread high grip and high resistance to abrasion and to laceration to the benefit of the handling in even more demanding manoeuvres, but may lead to high rolling resistance.

Conversely, a tread with little hysteresis ensures low rolling resistance, but, on the other hand, the grip is reduced.

A high hysteresis value at high temperatures ensures good road holding when the tyre is used under particularly severe driving conditions. During driving under non-extreme conditions, to limit the rolling resistance, and consequently to obtain low fuel consumption, it is advantageous for the hysteresis of the elastomeric material included in the tyre tread to be as low as possible at moderate temperatures.

Finally, the tread should show reduced thermoplasticity, in other words it should remain sufficiently rigid as the working temperature increases.

Since it does not seem possible to obtain the conflicting characteristics described above by using a compound based on only one elastomeric polymer, for the purposes of obtaining a tyre tread that has optimum characteristics from all viewpoints, elastomeric materials for tyre treads were prepared using blends of elastomeric polymers and/or copolymers with various physicochemical characteristics.

Typically, increased hysteresis may be obtained by introducing resins into the tread compound. The resins do not crosslink with the elastomeric polymers and/or copolymers which form the base elastomeric composition, consequently leading to degradation of the static-mechanical properties of the elastomeric composition. It is therefore possible for laceration of the tyre tread to take place, above all in the case of severe effort, even after a non-prolonged use of the tyre. A different approach followed is that of introducing materials that have a glass transition at higher temperature values than those of the elastomers into the elastomeric compound for the preparation of the tread.

For example, for a typical compound comprising styrene-butadiene rubber (SBR), raising the glass transition of the tread compound may be obtained by increasing the content of styrene used in the compound or by adding thermoplastic polymers or resins characterized by high transition temperatures, either of thermodynamic type such as the melting point, or of kinetic type such as the glass transition.

The presence of high percentages of styrene during the polymerization process promotes the formation of block copolymers, i.e. copolymers in which are present ten or more consecutive styrene units, which may have the typical glass transition temperature of polystyrene (+100° C.). These block copolymers are thermoplastic and therefore do not appear to be suitable for producing tyre treads, since their mechanical properties and abrasion resistance would be drastically compromised.

Unsaturated thermoplastic polymers have the advantage of crosslinking with the polymers and/or copolymers that form the base elastomeric composition, but, on the other hand, do not considerably increase the hysteresis of the finished tyre tread since they do not have a high content of styrene. In this case, the finished tyre tread will have better resistance to laceration, but reduced grip, when compared with a tyre tread in which resins are added.

In an attempt simultaneously to improve the grip and durability properties of the finished tyre tread, low molecular weight (LMW) resins and polymers are often used together. However, the combination of these materials does not make it possible fully to solve the problem of the resistance to wear (abrasion) of the tyre tread.

The Applicant thus considers that there is still a great need for compounds for high-performance tyre treads which make it possible to reconcile the characteristics described previously, in particular high hysteresis at high temperatures, but with optimum values at intermediate temperatures to reduce the rolling resistance, and better rigidity at high temperature, but with less thermoplastic behaviour of the tread as the temperature increases, at the same time maintaining optimum values for the static-mechanical properties, which ensure resistance to laceration and reduction of abrasion.

The Applicant has found, surprisingly, that a stereoregular styrene-butadiene elastomeric copolymer (in particular, with butadiene in trans conformation and styrene in isotactic configuration), with a styrene content higher than 30% by weight with respect to the total weight of copolymer and a molecular weight higher than 500,000 Dalton, may be advantageously used as a mixture with one or more different natural and/or synthetic elastomeric polymers in the preparation of the elastomeric composition used in the production of a tyre tread to overcome the abovementioned drawbacks.

In the context of the present description and of the claims that follow, a stereoregular styrene-butadiene elastomeric copolymer constituted by a sequence of butadiene in trans conformation and styrene in isotactic configuration is indicated by the term "iso-styrene/trans-butadiene elastomeric copolymer".

The term "trans conformation of butadiene" means the geometrical arrangement of butadiene monomers in which the two chain-propagating single bonds are arranged on opposite sides relative to the central double bond, as represented in the following structural formula:

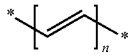

The term "isotactic configuration of styrene" means the isotactic arrangement of styrene monomers, i.e. the arrangement in which the carbon atoms bearing the styrene groups have the same relative configuration and the styrene groups have the same spatial arrangement relative to the plane, as represented in the following structural formula:

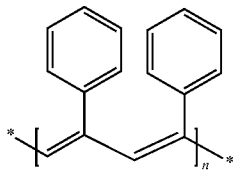

The butadiene and styrene monomers are arranged in the polymer chain randomly, as represented, for non-limiting illustrative purposes, in the following graphic representation, in which B indicates the butadiene monomer and S indicates the styrene monomer.

in which x and y are an integer from 1 to 4.

The Applicant has found, surprisingly, that the use of an elastomeric copolymer having the abovementioned characteristics in the preparation of the elastomeric composition used in the production of a tyre tread makes it possible to overcome the described drawbacks. In particular, the use of an elastomeric copolymer having the abovementioned characteristics in the preparation of the elastomeric composition used in the production of a tyre tread ensures a high supply of styrene in the elastomeric composition, avoiding the use of additives such as low molecular weight resins and polymers, which might reduce the mechanical performance qualities and/or the abrasion resistance.

Advantageously, the use of an iso-styrene/trans-butadiene elastomeric copolymer having the abovementioned characteristics in the preparation of the elastomeric composition used in the production of a tyre tread makes it possible to obtain a tyre tread characterized by reduced thermoplasticity while maintaining high values for the mechanical characteristics at rupture and/or high elongation, with respect to compounds in which conventional oils and resins are used, and high rigidity at high temperatures together with high hysteresis values at high temperatures.

A general decrease in the sensitivity of the tyre tread to the effects of temperature is thus obtained, above all to heating. In addition, the tyre tread shows less weakness, greater consistency of the performance qualities and improved resistance to laceration, even when subjected to severe effort, for example to high speed and/or during direction-change manoeuvres.

In a first aspect, the present invention thus relates to a tyre for vehicle wheels, comprising:
  a carcass structure;
  a tread band applied in a radially outer position with respect to said carcass structure;
  characterized in that said tread band comprises a cross-linked elastomeric material obtained by crosslinking a cross-linkable elastomeric composition, wherein said elastomeric composition comprises at least one iso-styrene/trans-butadiene elastomeric copolymer having a styrene content higher than 30% by weight with respect to the total weight of copolymer and a molecular weight higher than 500,000 Dalton.

In a second aspect, the present invention relates to an iso-styrene/trans-butadiene elastomeric copolymer, in which said elastomeric copolymer is constituted by a random sequence of butadiene in trans conformation and styrene in isotactic configuration, having a styrene content equal to or higher than 30% by weight with respect to the total weight of said copolymer and a molecular weight higher than 500,0000 Dalton.

Preferably, said iso-styrene/trans-butadiene elastomeric copolymer has a styrene content equal to or higher than 40%, more preferably equal to or higher than 50%, by weight with respect to the total weight of copolymer.

Said iso-styrene/trans-butadiene elastomeric copolymer has a 1,4-butadiene (i.e. butadiene polymerized in the 1-4 positions) content lower than 70%, preferably lower than 60% and more preferably lower than 50% by weight with respect to the total weight of copolymer.

Advantageously, said iso-styrene/trans-butadiene elastomeric copolymer has a styrene content lower than 60% by weight and a 1,4-butadiene content equal to or higher than 40% by weight, with respect to the total weight of copolymer.

Advantageously, said iso-styrene/trans-butadiene elastomeric copolymer may have a molecular weight higher than or equal to 600,000 Dalton, preferably higher than or equal to 700,000 Dalton, more preferably higher than or equal to 800,000 Dalton.

Preferably, said iso-styrene/trans-butadiene elastomeric copolymer may have a molecular weight lower than or equal to 1,500,000 Dalton, preferably lower than or equal to 1,250,000 Dalton and more preferably lower than or equal to 1,000,000 Dalton.

Preferably, the iso-styrene/trans-butadiene elastomeric copolymer is present in the elastomeric composition in an amount higher than 5 phr, more preferably higher than 10 phr.

Preferably, the iso-styrene/trans-butadiene elastomeric copolymer is present in the elastomeric composition in an amount lower than 50 phr, more preferably lower than 40 phr and even more preferably lower than 30 phr.

Advantageously, the iso-styrene/trans-butadiene elastomeric copolymer is present in the elastomeric composition in an amount comprised between 15 and 25 phr.

Preferably, the iso-styrene/trans-butadiene elastomeric copolymer has an inflection point Tg value (inflection point Tg) comprised between −50° C. and +20° C. measured by DSC at 10° C./min.

Advantageously, the iso-styrene/trans-butadiene elastomeric copolymer of the invention may be obtained by solution copolymerization using a homogeneous catalyst having the general formula (I):

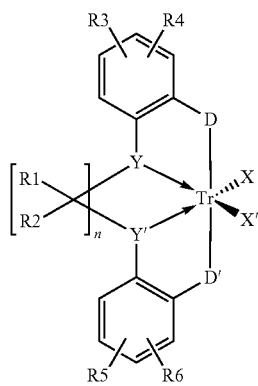

wherein

Tr is a transition metal,

X and X', which are the same or different, are a halogen atom,

R1 and R2, which are the same or different, are an H atom or a linear or branched alkyl group having from 1 to 10 carbon atoms, from R3 to R6, which are the same or different, are an H atom or a linear or branched alkyl group having from 1 to 10 carbon atoms, or a linear or branched arylalkyl group having from 7 to 14 carbon atoms, Y and Y', which are the same or different, are an oxygen, sulfur, selenium or tellurium atom, or an NR7 or PR7 group, D and D', which are the same or different, are an oxygen, sulfur, selenium or tellurium atom, or an NR7 or PR7 group, R7 is an H atom or a linear or branched alkyl group having from 1 to 10 carbon atoms, n is an integer from 1 to 10.

Tr is preferably a transition metal chosen from Ti, V, Cr, Mn, Fe, Co, Ni, Cu, Zr, Nb, Mo, Tc, Ru, Rh, Pd, Ce, Pr, Tb, Hf, Ta, W, Re, Os, Ir and Pt, more preferably from the elements of the third group, and even more preferably from titanium and zirconium.

Preferably, X and X', which are the same or different, are a chloride or bromide atom, a linear or branched alkylaryl or arylalkyl group having from 1 to 10 carbon atoms in the alkyl part and from 6 to 14 carbon atoms in the aryl part, a linear or branched alkoxy group having from 1 to 10 carbon atoms. More preferably, X and X' are a chloride atom, a benzyl group or an isopropoxy group.

R1 and R2, which are the same or different, are preferably a hydrogen atom or a linear or branched alkyl group having from 1 to 6 carbon atoms, more preferably from 1 to 3 carbon atoms.

From R3 to R6, which are the same or different, are preferably a hydrogen atom or a linear or branched alkyl group having from 1 to 6 carbon atoms, or a linear or branched arylalkyl group having from 7 to 10 carbon atoms.

Preferably, Y and Y' are the same and are chosen from oxygen and sulfur. More preferably, Y and Y' are both sulfur.

Preferably, D and D' are the same and are chosen from oxygen and sulfur. More preferably, D and D' are both oxygen.

R7 is preferably a hydrogen atom or a linear or branched alkyl group having from 1 to 6 carbon atoms, more preferably from 1 to 3 carbon atoms.

n is preferably an integer from 1 to 5.

A third aspect of the present invention relates to a process for the copolymerization of styrene and butadiene, comprising (i) preparing a solution of said styrene and butadiene in a suitable solvent, and (ii) adding to said solution a homogeneous catalytic system, in which said homogeneous catalytic system comprises a homogeneous catalyst having the abovementioned formula (I), and in which said copolymerization process achieves the formation of an iso-styrene/trans-butadiene elastomeric copolymer having a styrene content higher than 30% by weight with respect to the total weight of copolymer and a molecular weight higher than 500,000 Dalton.

According to a preferred embodiment of the present invention, in the abovementioned formula (I), R4 and R6 are linked to the benzene ring in the ortho position with respect to the D and D' substituent and are represented by a linear or branched arylalkyl group having from 7 to 14 carbon atoms, and R3 and R5 are linked to the benzene ring in the para position with respect to the D and D' substituent and are represented by an H atom or a linear or branched alkyl group having from 1 to 10 carbon atoms.

According to a more preferred embodiment of the present invention, the homogeneous catalyst is represented by the following formula (1):

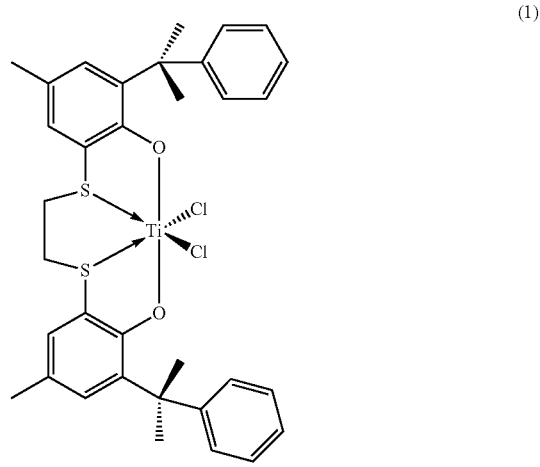

This catalyst has high catalytic activity and provides a high polymer yield (see, for example, those described by (i) P. Longo et al., "Chemoselectivity in 4-methyl-1,3-pentadiene polymerization in the presence of homogeneous Ti-based catalysts" Macromol. Rapid Commun. 18, 183-190 (1997), (ii) C. Capacchione et al., Macromolecules, 2011, 44, 7940-7947, "Living, Isoselective Polymerization of 4-Methyl-1,3-pentadiene and Styrenic Monomers and Synthesis of Highly Stereoregular Block Copolymers via Sequential Monomer Addition", and (iii) A. Proto et al., Macromolecules, 2010, 43, 5919-5921, "Living, Isoselective Polymerization of Styrene and Formation of Stereoregular Block Copolymers via Sequential Monomer Addition").

The abovementioned catalyst may be used in a process at room temperature and at normal atmospheric pressure, with appreciable advantages as regards costs and safety of the industrial process.

The copolymerization process is performed in a suitable solvent, preferably an aprotic solvent. Useful aprotic solvents are, for example, aliphatic hydrocarbons, such as pentane, hexane and cyclohexane, aromatic hydrocarbons, such as benzene, toluene, xylene and ethylbenzene, and halogenated hydrocarbons, such as dichloromethane. The preferred solvents are aromatic hydrocarbons, in particular toluene. Obviously, mixtures of the abovementioned solvents may also be used.

The starting concentration of each comonomer added is generally set at a value of between 0.001 and 10 mol per litre, preferably between 0.01 and 8 mol per litre. The reaction temperature may be within a relatively wide range depending on the solvent used. The reaction temperature is usually between 0° C. and 100° C., and in particular preferably between 10° C. and 40° C. Preferably, the copolymerization process is performed at room temperature. The reaction is performed for a time period of between 15 minutes and 75 hours, preferably between 30 minutes and 30 hours. The reaction may be performed at pressures of between 0.1 and 10 atmospheres. The reaction is usually performed at pressures of between 0.5 and 5 atmospheres. Preferably, the copolymerization process is performed at atmospheric pressure.

The copolymerization process is preferably performed under controlled reaction conditions, i.e. with the exclusion of oxygen and moisture. If desired, an inert gas, such as argon or nitrogen, may be used. The polymerization reaction begins with the addition of the catalyst to the solution of the monomers. In particular, the catalyst is added to the solution of styrene and butadiene. The catalyst may be added as such or in solution. The copolymerization process preferably comprises the use of an activator, for instance aluminoxanes and alkylaluminiums, as known in the art. Examples of suitable alum inoxane compounds include methylaluminoxanes (MAO), polymeric MAO (PMAO), ethylaluminoxane, diisobutylaluminoxane, and the like. Examples of suitable alkylaluminium compounds include triethylaluminium, diethylaluminium chloride, trimethylaluminium and triisobutylaluminium. The copolymerization process is stopped by adding a protic compound, for example a low molecular weight alcohol, such as methanol, ethanol or isopropanol, or by removing the solvent. The iso-styrene/trans-butadiene elastomeric copolymer thus obtained is generally solid and may be recovered from organic solvents via conventional techniques, such as decantation, filtration, centrifugation, and so on. The iso-styrene/trans-butadiene elastomeric copolymer may then be purified via conventional techniques, such as washing or steam extraction, to remove the impurities, typically represented by volatile organic compounds.

The crosslinkable elastomeric composition comprises, as a mixture with the iso-styrene/trans-butadiene elastomeric copolymer that is useful in the present invention, at least one high molecular weight elastomeric polymer, preferably a dienic elastomeric polymer, of natural or synthetic origin.

Preferably, said elastomeric polymer is present in an amount lower than 95 phr, more preferably lower than 90 phr.

Preferably, said elastomeric polymer is present in an amount higher than 50 phr, more preferably higher than 70 phr.

Advantageously, said elastomeric polymer is present in the elastomeric composition in an amount comprised between 85 and 75 phr.

For the purposes of the present description and of the following claims, the term "phr" indicates the parts by weight of a certain component of the crosslinkable elastomeric composition per 100 parts by weight of elastomeric polymers or copolymers.

Preferably, said dienic elastomeric polymer is selected from the group comprising: cis-1,4-polyisoprene (natural or synthetic, preferably natural rubber), 3,4-polyisoprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

The dienic elastomeric polymers described above may optionally be functionalized with suitable terminating or coupling agents.

Advantageously, the crosslinkable elastomeric composition typically also comprises at least one reinforcing filler which may be selected from those commonly used for crosslinked manufactured products, in particular for tyres, for instance: carbon black, silica and silicates, alumina, calcium carbonate, or mixtures thereof. Carbon black, silica and mixtures thereof are particularly preferred.

Preferably, said reinforcing filler may be present in the crosslinkable elastomeric composition in an amount generally lower than 130 phr, preferably from 40 phr to 100 phr.

According to a preferred embodiment, said carbon black reinforcing filler may be selected from those with a surface area not lower than 20 $m^2/g$ (determined by STSA—Statistical Thickness Surface Area—according to ISO 18852: 2005).

According to a preferred embodiment, said silica reinforcing filler may be, for example, precipitated silica.

The silica reinforcing fillers that may advantageously be used according to the present invention preferably have a BET surface area of about 30 $m^2/g$ to 400 $m^2/g$, more preferably from about 100 $m^2/g$ to about 250 $m^2/g$, even more preferably from about 120 $m^2/g$ to about 220 $m^2/g$. The pH of said silica reinforcing filler is generally from about 5.5 to about 7, preferably from about 5.5 to about 6.8.

Examples of silica reinforcing fillers that may be used according to the present invention and that are commercially available are the products known under the names Hi-Sil® 190, Hi-Sil® 210, Hi-Sil® 233, Hi-Sil® 243 available from PPG Industries (Pittsburgh, Pa.); or the products known under the names Ultrasil® VN2, Ultrasil® VN3 from Evonik; or the product known under the name Zeosil® 1165MP from Rhodia.

Advantageously, the elastomeric composition comprises at least one silane coupling agent that is capable of interacting with the reinforcing filler and bonding it to the elastomeric polymer during the vulcanization.

The coupling agents that are preferably used are those based on silane, which may be identified, for example, by the following structural formula (VI):

$$(R_2)_3Si—C_tH_{2t}-X \qquad (VI)$$

in which the groups $R_2$, which may be the same or different, are selected from: alkyl, alkoxy or aryloxy groups or from halogen atoms, on condition that at least one of the groups $R_2$ is an alkoxy or aryloxy group; t is an integer between 1 and 6, limits inclusive; X is a group selected from nitroso, mercapto, amino, epoxide, vinyl, imide, chloro, —(S)$_u$C$_t$H$_{2t}$—Si—(R$_2$)$_3$ or —S—COR$_2$, in which u and t are integers from 1 to 6, limits inclusive, and the groups $R_2$ are defined as reported above.

Coupling agents that are particularly preferred are: bis(3-triethoxysilylpropyl) tetrasulfide and bis(3-triethoxysilylpropyl) disulfide. Said coupling agents may be used as such or as a suitable mixture with an inert filler (for example carbon black) so as to facilitate their incorporation into the crosslinkable elastomeric composition.

Preferably, the coupling agent is added to the crosslinkable elastomeric composition in an amount of from 1% to 20% by weight, more preferably from 5% to 15% by weight and even more preferably from 8% to 12% by weight with respect to the weight of silica.

The crosslinkable elastomeric composition mentioned above may be vulcanized according to the known techniques, in particular with sulfur-based vulcanization systems commonly used for elastomeric polymers. To this end, after one or more phases of thermomechanical processing, a sulfur-based vulcanizing agent is incorporated into the composition together with vulcanizing accelerators. In the final processing phase, the temperature is generally maintained below 120° C. and preferably below 100° C., so as to avoid any undesired pre-crosslinking.

The vulcanizing agent more advantageously used is sulfur or molecules containing sulfur (sulfur donors), with vulcanization activators, accelerators and retardants, which are known to those skilled in the art.

Activators that are particularly effective are zinc compounds, and in particular ZnO, zinc salts of saturated or unsaturated fatty acids, for instance zinc stearate, which are preferably formed in situ in the elastomeric composition from ZnO and fatty acids. Useful activators may also be inorganic oxides or salts of Fe, Cu, Sn, Mo and Ni as described in patent application EP 1 231 079. Stearic acid is typically used as activator with zinc oxide.

Said vulcanization activators are preferably used in the crosslinkable elastomeric composition in an amount from about 0.5 phr to about 10 phr, more preferably from 1 phr to 5 phr. Accelerators that are commonly used may be selected from: dithiocarbamates, guanidine, thiourea, thiazoles, sulfenamides, thiourams, amines and xanthates, or mixtures thereof.

The vulcanization retardants that are commonly used may be selected, for example, from: urea, N-cyclohexyl-2-benzothiazolyl sulfenamide, N-cyclohexylphthalimide, N-cyclohexylthiophthalimide, N-nitrosodiphenylamine, or mixtures thereof.

Said vulcanization retardants are optionally used in the crosslinkable elastomeric composition in an amount of less than 1 phr, more preferably less than 0.5 phr and even more preferably from about 0.1 phr to about 0.3 phr.

The crosslinkable elastomeric composition may comprise other additives commonly used on the basis of the specific application for which the composition will be used. For example, the following may be added to the elastomeric composition: antioxidants, anti-ageing agents, plasticizers, adhesives, antiozonizers (in particular of the p-phenylenediamine type), waxes, modified resins, fibres (for example Kevlar® pulp), or mixtures thereof.

The crosslinkable elastomeric composition mentioned above may be prepared by mixing the elastomeric base components together with the other additives optionally present, according to the techniques known in the art. The mixing phases may be performed, for example, by using an open mixer of the open blender type or an internal mixer of the type with tangential rotors (Banbury) or with co-penetrating rotors (Intermix), or in continuous mixers of the Ko-Kneader type (Buss), or of the co-rotating or counter-rotating twin impeller type.

DRAWINGS

FIG. 1 shows a view in cross section of a portion of a tyre.

DETAILED DESCRIPTION OF THE INVENTION

The present invention shall be illustrated in further detail by means of an illustrative embodiment with reference to the attached FIG. 1.

"a" indicates an axial direction and "r" indicates a radial direction. For simplicity, FIG. 1 shows only part of the tyre, the remaining part not shown being identical and arranged symmetrically with respect to the radial direction "r".

The reference number 1 in FIG. 1 indicates a tyre for vehicle wheels, which generally comprises a carcass structure 2 comprising at least one carcass ply 3 having respectively opposite end strips secured to respective annular anchoring structures 4, optionally associated with the elastomeric fillers 4a, incorporated into the zones 5 usually identified by the name "beads".

The carcass structure 2 is associated with a belt structure 6 comprising one or more belt layers 6a, 6b located in radial superposition relative to each other and relative to the carcass ply 3, having reinforcing cords that are typically metallic. These reinforcing cords may have a crossed orientation relative to a circumferential direction of the tyre 1. The term "circumferential" direction means a direction generically given according to the direction of rotation of the tyre, or at least slightly inclined relative to the direction of rotation of the tyre.

A tread band 7 made of elastomeric compound is applied in a radially outer position with respect to the belt structure 6, as are other constituent semi-finished parts of the tyre 1.

Respective side walls 8 made of elastomeric compound are also applied in an axially outer position on the side surfaces of the carcass structure 2, each extending from one of the side edges of the tread band 7 up to the respective annular structure for anchoring to the beads 5.

A radially inner surface of the tyre 1 is also preferably internally lined with a layer of elastomeric material that is substantially impermeable to air, referred to as the liner 9.

The belt structure 6 also comprises at least one reinforcing layer 6c that is radially outer with respect to the belt layers 6a, 6b. The radially outer reinforcing layer 6c comprises textile or metal cords, arranged at a substantially zero angle relative to the circumferential direction of the tyre and immersed in the elastomeric material. Preferably, the cords are arranged substantially parallel and side by side to form a plurality of coils. These coils are substantially oriented in the circumferential direction (typically with an angle of between 0° and 5°), this direction usually being referred to as "zero degrees" with reference to its position relative to the equatorial plane X-X of the tyre. The term "equatorial plane" of the tyre means a plane perpendicular to the axis of rotation of the tyre and which subdivides the tyre into two symmetrically equal parts.

Preferably, but not exclusively, the tyre 1 for motor vehicles is of the HP (High Performance) or UHP (Ultra-High Performance) type, i.e. it is a tyre that is capable of withstanding maximum speeds of at least 190 km/h, up to over 300 km/h. Examples of such tyres are those belonging to the classes "T", "U", "H", "V", "ZR", "W", "Y" according to the E.T.R.T.O. classification.

The manufacture of the tyre 1 as described above is performed by assembling the respective semi-finished parts on a moulding drum, not shown, performed by at least one assembling device.

At least a part of the components intended to form the carcass structure 2 of the tyre 1 is constructed and/or assembled on the moulding drum. More particularly, the moulding drum serves to receive first the optional liner 9, and then the carcass ply 3. Next, devices, not shown, engage coaxially around each of the end strips of one of the annular anchoring structures 4, position an outer sleeve comprising the belt structure 6 and the tread band 7 in a coaxially centred position around the cylindrical carcass sleeve and conform the carcass sleeve in a toroidal configuration by radial dilation of the carcass ply 3, so as to apply it against a radially internal surface of the outer sleeve.

Following the manufacture of the raw tyre 1, a pressing and vulcanization treatment is performed, aimed at establishing structural stabilization of the tyre 1 by crosslinking of the elastomeric mixtures and also at imprinting on the tread band 7 a desired tread pattern and imprinting on the side walls 8 optional distinctive graphic signs.

The present invention shall be further illustrated hereinbelow by means of a certain number of preparative examples, which are given for purely indicative purposes and without any limitation of the present invention.

EXAMPLES

Example 1—Synthesis of Iso-Styrene/Trans-Butadiene Copolymer of Molecular Weight 538,000 Dalton with 40% by Weight of Styrene (Polymer SBR-3)

Styrene (109 g; 1.04 mol), butadiene (170 g; 3.3 mol; 4.6 M solution in toluene) and MAO (0.1 mol; 103 ml; 10 wt % solution in toluene) were placed in a 3000 ml round-bottomed flask equipped with a magnetic stirrer, under an inert atmosphere.

After bringing the solution to the reaction temperature (T=0° C.), polymerization was started by adding the catalyst of formula 1 described previously (0.102 g; 155 μmol), dissolved in 20 ml of toluene. The mixture was left stirring at 0° C. for 24 hours and at 25° C. for a further 24 hours, 500 ml of toluene being added.

The polymerization was stopped by pouring the contents of the flask into ethanol acidified with HCl and 2,6-di-tert-butyl-4-methylphenol (BHT) as antioxidant.

The coagulated polymer was washed with ethanol, filtered and dried in a vacuum oven at 30-40° C.

The yield was 93%. The resulting polymer had a molecular weight of about 538,000 Dalton measured by gel permeation chromatography (GPC). The measurement was performed at 35° C., using THF as solvent, at a flow rate of 1 ml/min, and using a refraction index revealer. The instrument allows for the use of 4 columns with variable pore sizes. Calibration is performed using polystyrene standards. The polydispersity index is equal to about 2.2, and the Tg is about −43° C.

Example 2—Synthesis of Iso-Styrene/Trans-Butadiene of Molecular Weight, 117,000 Dalton with 42% by Weight of Styrene (Polymer SBR-2)

Styrene, butadiene, MAO and the catalyst of formula 2 described below dissolved in 10 ml of toluene were placed in a 2000 ml round-bottomed flask equipped with a magnetic stirrer, under an inert atmosphere, via a procedure similar to that described previously. The reaction mixture was left stirring at room temperature for 24 hours. The reaction was terminated by pouring the contents of the flask into ethanol acidified with HCl and BHT as antioxidant. After washing with fresh ethanol, the polymer was recovered by filtration and dried in a vacuum oven at 40° C. for about 3 days.

The yield was 92%. The resulting polymer had a molecular weight of about 117,000 Dalton with a polydispersity index equal to about 1.7 and a Tg of about −39° C.

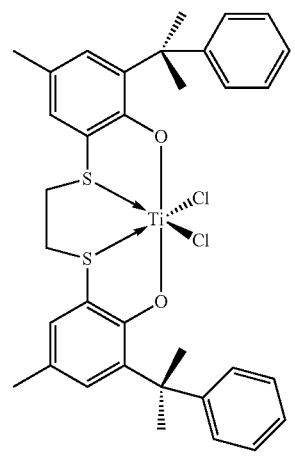

Catalyst of formula 1

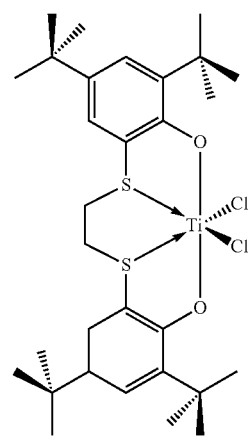

Catalyst of formula 2

Example 3—Preparation of the Elastomeric Compositions

The elastomeric compositions R1, R2 and I1 illustrated in Table 1 below were prepared, respectively, by using the branched styrene-butadiene polymer HP 755 from JSR (polymer SBR-1) composed of 39% by weight of styrene and 61% by weight of butadiene, supplemented with 37.5 phr of TDAE oil, obtained by an ionic synthesis in solution having molecular weights (Mw) of about 1,000 kDa with a polydispersity index of about 1.67 and a glass transition temperature measured by DSC (10° C./min) of about −31° C. and of about −21° C. for the pure polymer (after extraction of the TDAE oil), and the polymers SBR-2 and SBR-3 having the characteristics described above.

Composition R1, used as first reference, contains as solid polymer only the polymer SBR-1, which, being a polymer obtained by anionic synthesis, has no stereoregularity in the spatial arrangement of the butadiene and styrene monomers. In particular, in the chain of the polymer SBR-1, the arrangement of the styrene monomers is entirely atactic, whereas the arrangement of the butadiene monomers is about 38% in position 1,2, and the remaining 62% arranged in position 1,4 is distributed randomly between the iso form and the trans form.

Composition R2, used as second reference, comprises both the polymer SBR-1 and 20 phr of polymer SBR-2, with a low molecular weight (117 kDa).

Composition I1, used in the tread of a tyre according to the invention, comprises both the polymer SBR-1 and 20 phr of polymer SBR-3, with a high molecular weight (538 kDa).

The polymers SBR-2 and SBR-3, obtained by stereoselective synthesis, have, on the other hand, a precise stereoregularity, in which the arrangement of the styrene monomers is isotactic, whereas the arrangement of the butadiene monomers is totally 1,4-trans and entirely free of 1,4- and 1,2-cis forms.

All the compositions have the same total content of oil, as the sum of the polymer extender oil (37.5 phr for R1, 30 for R2 and I1) and the free oil (0 phr for R1, 7.5 for R2 and I1).

All the components, except for the vulcanization agents and the accelerators, were mixed together for about 5 minutes in a 200 ml Haake blender, the rotors being maintained at a spin speed of 60 rpm and the initial rotor temperature was set at about 100° C. (first phase).

At the end, the elastomeric composition was discharged at about 135° C. and left to stand for 24 hours at room temperature. The mix was taken up and mixing was again performed (second phase), adding ZnO, 6PPD and carbon black. The vulcanization agents and accelerators were then successively added (finishing phase). Finally, the elastomeric composition was vulcanized in suitable moulds by means of a steam press via an isothermic cycle of 30 minutes at 151° C.

All the amounts in Table 1 are expressed in phr.

TABLE 1

| | Compounds | | |
|---|---|---|---|
| | R1 | R2 | I1 |
| FIRST PHASE | | | |
| SBR-1 | 137.5 | 110 | 110 |
| SBR-2 | — | 20 | — |
| SBR-3 | — | — | 20 |
| TDAE | — | 7.5 | 7.5 |
| Zeosil 1165 | 65 | 65 | 65 |
| TESPT | 8 | 8 | 8 |
| Kristalex F85 | 10 | 10 | 10 |
| Stearic acid | 2.5 | 2.5 | 2.5 |
| Wax | 1.5 | 1.5 | 1.5 |
| SECOND PHASE | | | |
| ZnO | 1.5 | 1.5 | 1.5 |
| 6PPD | 3 | 3 | 3 |
| CB N115 | 10 | 10 | 10 |
| FINISHING PHASE | | | |
| MBTS | 1.2 | 1.2 | 1.2 |
| TBBS | 1.6 | 1.6 | 1.6 |
| Sulfur | 1.5 | 1.5 | 1.5 |

Zeosil 1165: precipitated silica with a BET surface area equal to about 165 $m^2/g$ (Rhone-Poulenc);

TESPT: bis(3-triethoxysilylpropyl) tetrasulfide (Degussa-Hüls);

Kristalex F85: α-methylstyrene resin (Eastman Chemical Co., USA);

CB N115: carbon black N115 (Evonik Degussa GmbH, Germany);

6PPD (antioxidant): N-(1,3-dimethylbutyl)-N'-phenyl-p-phenylenediamine (Lanxess Deutschland GmbH, Germany);

MBTS (accelerator): 2,2'-dithiobisbenzothiazole (Lanxess Deutschland GmbH, Germany);

TBBS (accelerator): N-tert-butyl-2-benzothiazole sulfenamide (Lanxess Deutschland GmbH, Germany).

Example 5—Characterization of the Elastomeric Compositions

The characteristics of each elastomeric composition were evaluated as described below and the results are collated in Table 2 below.

The static mechanical properties (load at 50%, 100% and 300% of elongation, referred to respectively as CA05, CA1, CA3, breaking load and elongation at break) were measured according to standard ISO 37:2005, on samples of the previously described elastomeric compositions crosslinked at 151° C. for 30 minutes.

The dynamic mechanical properties were measured with a dynamic tensile testing machine of servo-hydraulic type in traction-compression mode according to the following methods. A sample of the crosslinked (at 151° C., for 30 minutes) elastomeric composition of cylindrical form (length=25 mm; diameter=12 mm), pre-compression loaded up to 25% of longitudinal deformation relative to the initial length, and maintained at preset temperatures (23° C., 70° C., 100° C. and 120° C.) throughout the test, was subjected to a dynamic sinusoidal deformation having an amplitude of ±3.5% relative to the length under preloaded conditions, with a frequency of 100 Hz. The dynamic mechanical properties are expressed in terms of the dynamic elastic modulus (E') and loss factor values (Tan δ). The Tan δ value is calculated in the present case as the ratio between the viscous modulus (E") and the elastic modulus (E').

The abrasion was measured with the rotating drum apparatus according to and with the method envisaged in standard DIN ISO 4649: 2014-03.

TABLE 2

| REFERENCE PARAMETERS | ELASTOMERIC COMPOSITION | | |
|---|---|---|---|
| | R1 | R2 | I1 |
| CA05 [MPa] | 1.42 | 1.38 | 1.38 |
| CA1 [MPa] | 2.56 | 2.33 | 2.31 |
| CA3 [MPa] | 11.69 | 9.91 | 10.5 |
| Breaking load [MPa] | 18.09 | 17.79 | 20.24 |
| Elongation at break [%] | 469.44 | 537.46 | 545.22 |
| Energy [J/cm$^3$] | 37.42 | 42.99 | 48.8 |
| E'(23° C.) at 100 Hz [MPa] | 11.084 | 12.002 | 11.786 |
| E'(70° C.) at 100 Hz [MPa] | 6.115 | 7.055 | 7.044 |
| E'(100° C.) at 100 Hz [MPa] | 5.746 | 6.205 | 6.415 |
| E'(120° C.) at 100 Hz [MPa] | — | — | 6.238 |
| Tan δ(23° C.) at 100 Hz | 0.512 | 0.501 | 0.482 |
| Tan δ(70° C.) at 100 Hz | 0.189 | 0.207 | 0.195 |
| Tan δ(100° C.) at 100 Hz | 0.124 | 0.147 | 0.136 |
| Tan δ(120° C.) at 100 Hz | — | — | 0.136 |
| Abrasion | 128.8 | 135.0 | 118.6 |
| ΔE' (23 ÷ 100° C.) | 5.338 | 5.800 | 5.371 |

According to the Applicant's experience, the parameters that best predict the road behaviour of a tyre are the dynamic-mechanical properties of the elastomeric compositions, in particular the elastic modulus or storage modulus (E'), the viscous modulus or dissipative modulus (E") and the ratio between the viscous modulus and the elastic modulus, known as the tangent delta (Tan δ), which is an indicator of the hysteretic behaviour, and the static-mechanical properties of the elastomeric compositions, in particular the load at various levels of elongation, the breaking load and the percentage of elongation at break.

As regards the dynamic-mechanical properties, the Applicant considers that a high Tan δ value at high temperatures (around and above 100° C.) ensures good road holding when the tyre is used under particularly hard driving conditions. In other words, it is considered that a high Tan δ value at high temperatures (around and above 100° C.) is directly correlated with the capacity of the tread compound to ensure high holding (high friction coefficient) and in general high performance under conditions of high thermal stress under extreme driving conditions (hard handling) to which the tyres of high-power and high-performance cars are typically subjected.

In addition, the elastic modulus (E') undergoes an inevitable reduction in value due to the temperature effect, but the variation should be as limited as possible, so that at low temperature values (for example at 23° C.) the value should not be excessively high, whereas at high temperatures, the value should be as high as possible. In other words, controlling the variation of the dynamic rigidity, i.e. limiting the increase in the dynamic modulus E' at low temperature (23° C.) and its decrease at high temperature (70°, 100° and 120° C.) maintains the correct balance between developing grip at low temperature and obtaining performance and thrust under extreme driving conditions at high temperatures.

As regards the static-mechanical properties, on the basis of the Applicant's experience, it is considered that high load values at various levels of elongation and a high breaking energy give the compound suitable mechanical properties, in terms of resistance to laceration and wear resistance. In particular, on the basis of the Applicant's experience, it is considered that a relatively low static modulus CA3 combined with a high tans value at 70° and 100° C. characterize compounds with high resistance to the initiation and propagation of laceration.

The results of Table 2 showed that the elastomeric composition I1 comprising the copolymer SBR-3 as described above had on the whole better mechanical properties, both static and dynamic, relative to the reference elastomeric compositions R1 and R2.

In point of fact, as regards the static mechanical properties, the elastomeric composition 11 showed load values at 300% more in line with the R1 reference values relative to that observed for composition R2, ensuring an appreciable improvement in the breaking properties BL and EB relative to the latter.

The breaking load and the elongation at break, similar to the breaking energy, showed optimum values, with a significant improvement relative to the values obtained with the reference compositions R1 and R2.

The surprising result of 11 may give a tyre comprising a tread made with such compositions an appreciable improvement in the resistance to laceration, and less abrasion, confirmed by the results of the specific test, with consequent improved durability of the tyre.

On the other hand, as regards the dynamic mechanical properties, the elastomeric composition 11 showed overall elastic modulus (E') values that were higher than the value for the reference compositions R1 and R2, but above all composition 11 showed a surprisingly high E' value at 100° C. and 120° C. as compared with an E' at 23° that tended to be lower than the values for R2. The surprising result of 11 can give a tyre comprising a tread made with such a composition better driving behaviour and stability under extreme driving conditions relative to both R1 and R2.

In addition, the elastomeric composition 11 showed high Tan δ values at high temperatures (100° C. and 120° C.), ensuring good grip of the tyre under particularly hard driving conditions (high temperature), better than that for R1 and substantially in line with that for R2.

The invention claimed is:

1. A tire for vehicle wheels, comprising:
   a carcass structure; and
   a tread band applied in radially outer position with respect to said carcass structure;
   wherein said tread band comprises a crosslinked elastomeric material obtained by crosslinking a crosslinkable elastomeric composition, and
   wherein said elastomeric composition comprises an isostyrene/trans-butadiene elastomeric copolymer, wherein the copolymer consists of a random sequence of butadiene in trans conformation and styrene in isotactic configuration, with a styrene content higher than 30% by weight with respect to the total weight of copolymer and a molecular weight equal to or higher than 538,000 Dalton.

2. The tire for vehicle wheels according to claim 1, wherein said copolymer has a styrene content equal to or higher than 40% by weight with respect to the total weight of copolymer.

3. The tire for vehicle wheels according to claim 1, wherein said copolymer has a 1,4-butadiene content lower than 60% by weight with respect to the total weight of copolymer.

4. The tire for vehicle wheels according to claim 1, wherein said copolymer has a molecular weight higher than or equal to 600,000 Dalton.

5. The tire for vehicle wheels according to claim 1, wherein said copolymer has a molecular weight of higher than 538,000 Dalton and lower than or equal to 1,500,000 Dalton.

6. The tire for vehicle wheels according to claim 1, wherein said elastomeric composition comprises an amount of said copolymer higher than 5 phr.

7. The tire for vehicle wheels according to claim 1, wherein said elastomeric composition comprises an amount of said copolymer higher than 5 phr and lower than 50 phr.

8. The tire for vehicle wheels according to claim 6, wherein said elastomeric composition comprises an amount of said copolymer ranging from 15 to 25 phr.

9. An iso-styrene/trans-butadiene elastomeric copolymer, wherein said copolymer consists of a random sequence of butadiene in trans conformation and styrene in isotactic configuration, wherein the copolymer has a styrene content higher than 30% by weight with respect to the total weight of said copolymer and has a molecular weight equal to or higher than 538,000 Dalton.

10. The iso-styrene/trans-butadiene elastomeric copolymer according to claim 9, wherein said copolymer has a styrene content equal to or higher than 40%, by weight with respect to the total weight of copolymer.

11. The iso-styrene/trans-butadiene elastomeric copolymer according to claim 9, wherein said copolymer has a 1,4-butadiene content lower than 60%, by weight with respect to the total weight of copolymer.

12. The iso-styrene/trans-butadiene elastomeric copolymer according to claim 9, wherein said copolymer has a molecular weight higher than or equal to 600,000 Dalton.

13. The iso-styrene/trans-butadiene elastomeric copolymer according to claim 9, wherein said copolymer has a molecular weight higher than 538,000 Dalton and lower than or equal to 1,500,000 Dalton.

14. The iso-styrene/trans-butadiene elastomeric copolymer according to claim 9, wherein said copolymer also has an inflection point Tg value comprised between −50° C. and +20° C. measured with DSC at 10° C./min.

* * * * *